(12) United States Patent
Killer et al.

(10) Patent No.: US 7,223,023 B2
(45) Date of Patent: May 29, 2007

(54) OPTOELECTRONIC TRANSMISSION AND/OR RECEPTION ARRANGEMENTS

(75) Inventors: Thomas Killer, Hohenschambach (DE); Hans-Ludwig Althaus, Lappersdorf (DE); Josef Wittl, Parsberg (DE); Frank Weberpals, Regensburg (DE); Alfred Hartl, Pettendorf (DE)

(73) Assignee: Infineon Technologies AG, Munich (DE)

( * ) Notice: Subject to any disclaimer, the term of this patent is extended or adjusted under 35 U.S.C. 154(b) by 132 days.

(21) Appl. No.: 10/850,363

(22) Filed: May 19, 2004

(65) Prior Publication Data

US 2005/0013554 A1 Jan. 20, 2005

(30) Foreign Application Priority Data

May 19, 2003 (DE) .................. 103 22 757

(51) Int. Cl.
*G02B 6/36* (2006.01)
(52) U.S. Cl. .......................... 385/88; 385/53
(58) Field of Classification Search ........... 385/53, 385/88
See application file for complete search history.

(56) References Cited

U.S. PATENT DOCUMENTS

| | | | |
|---|---|---|---|
| 4,188,708 A | 2/1980 | Frederiksen |
| 4,268,113 A | 5/1981 | Noel, Jr. |
| 6,014,476 A | 1/2000 | Meyer-Guldner et al. |
| 6,115,521 A | 9/2000 | Tran et al. |
| 6,188,118 B1 | 2/2001 | Severn |
| 6,285,808 B1 | 9/2001 | Mehlhorn et al. |
| 6,309,566 B1 | 10/2001 | Muller et al. |
| 6,550,982 B2 | 4/2003 | Auburger et al. |
| 2001/0022370 A1 | 9/2001 | Meyer-Guldner |
| 2002/0021871 A1 | 2/2002 | Auburger et al. |
| 2002/0094175 A1 | 7/2002 | Oskarsson |

FOREIGN PATENT DOCUMENTS

| | | |
|---|---|---|
| DE | 35 43 558 A1 | 6/1987 |
| DE | 196 22 459 C1 | 11/1997 |
| DE | 196 43 911 A1 | 5/1998 |
| DE | 197 18 950 A1 | 11/1998 |
| DE | 19733174 A1 * | 2/1999 |
| DE | 198 26 648 A1 | 12/1999 |
| DE | 198 34 090 A1 | 2/2000 |
| DE | 199 09 242 A1 | 8/2000 |
| DE | 199 17 325 A1 | 10/2000 |
| DE | 100 34 865 A1 | 2/2002 |
| DE | 101 63 726 A1 | 7/2002 |
| DE | 101 27 550 A1 | 12/2002 |

(Continued)

Primary Examiner—Jennifer Doan
(74) Attorney, Agent, or Firm—Eschweiler & Associates, LLC

(57) ABSTRACT

Optoelectronic transmission and/or reception arrangements having a surface-mounted optoelectronic component and a circuit board provided with electrical lines, the optoelectronic component being surface-mounted on said circuit board, the optical axis of the optoelectronic component running perpendicular to the plane of the circuit board. In one embodiment, provision is made of a holding apparatus for receiving and orienting an optical waveguide to be coupled to the optoelectronic component, which holding apparatus directly adjoins the side of the optoelectronic component that is remote from the circuit board. In another embodiment, the circuit board has a cutout and light is coupled into or out of the optoelectronic component in the direction of the cutout of the circuit board.

23 Claims, 4 Drawing Sheets

FOREIGN PATENT DOCUMENTS

| | | |
|---|---|---|
| EP | 0 017 701 A1 | 10/1980 |
| EP | 0 404 053 A2 | 12/1990 |
| EP | 0 585 186 A2 | 3/1994 |
| EP | 0 633 607 A1 | 1/1995 |
| EP | 1 168 022 A2 | 1/2002 |
| JP | 06151903 A | 5/1994 |
| WO | WO 98/50811 | 11/1998 |
| WO | WO 00/07052 | 2/2000 |

\* cited by examiner

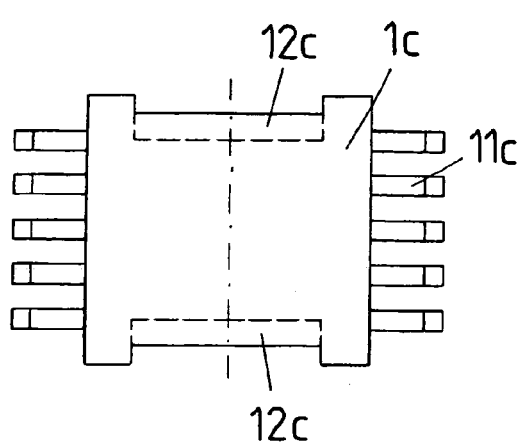
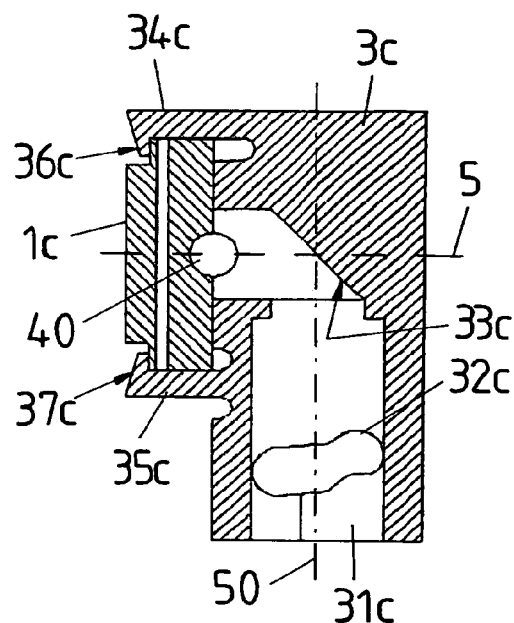
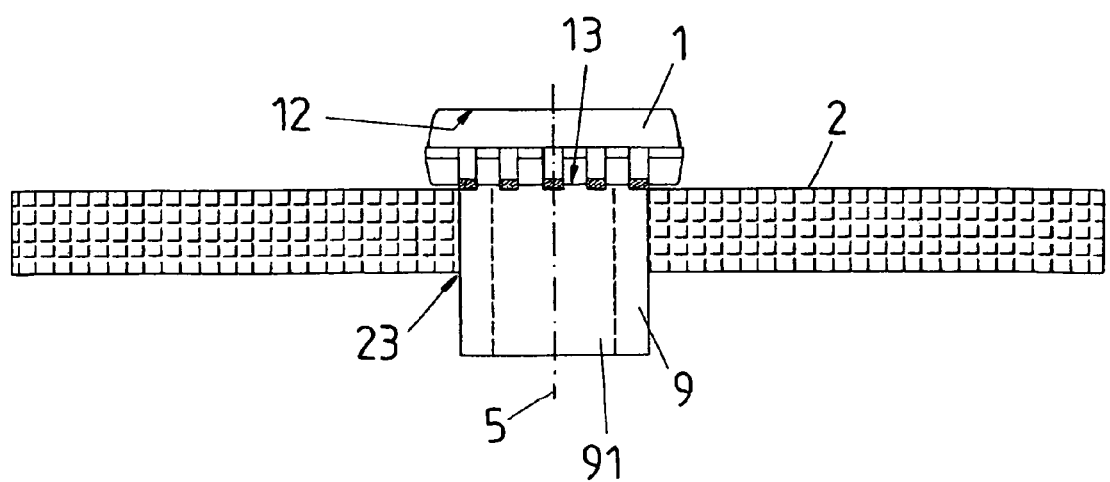

OPTOELECTRONIC TRANSMISSION AND/OR RECEPTION ARRANGEMENTS

FIELD OF THE INVENTION

The invention relates to optoelectronic transmission and/or reception arrangements having a surface-mounted optoelectronic component. It enables, in particular, a cost-effective mechanical and optical coupling of an optical fiber to the SMD housing of a surface-mounted optoelectronic component.

BACKGROUND OF THE INVENTION

DE 199 09 242 A1 discloses an optoelectronic module in which a leadframe with an optoelectronic transducer is positioned in a module housing and encapsulated with a light-transmissive, moldable material. Light is coupled in or out via an optical fiber coupled to a connector of the module housing. The driver module or reception module for the optoelectronic transducer is also situated on the leadframe.

There is a need for optoelectronic transmission and/or reception arrangements in which the transmission components and/or reception components can be arranged in surface-mounted devices (SMD—Surface Mounted Device) and accordingly be mounted on a printed circuit board in a simple manner using the standards of SMD technology.

SUMMARY OF THE INVENTION

Accordingly, the present invention is directed to optoelectronic transmission and/or reception arrangements which enable a reliable coupling of an optical waveguide, even when using SMD devices for the optoelectronic components, and at the same time are distinguished by a compact and cost-effective construction.

Accordingly, the solution according to the invention is distinguished, in a first aspect of the invention, by an arrangement comprising a surface-mounted optoelectronic component, a holding apparatus for receiving and orienting an optical waveguide to be coupled to the optoelectronic component, and a circuit board provided with electrical lines, the optoelectronic component being surface-mounted on said circuit board. In this case, the optical axis of the surface-mounted optoelectronic component runs perpendicular to the plane of the circuit board and the holding apparatus adjoins the side of the optoelectronic component that is remote from the circuit board.

The invention provides a compact construction which permits an optical and mechanical coupling of an optical waveguide to a surface-mounted optoelectronic component. In this case, the surface-mounted component corresponds to the SMD (Surface Mounted Device) standard. It is possible to have recourse to standardized and highly automated production methods, with the result that a cost-effective solution is present, too.

Preferably, the holding apparatus has a receiving opening for an optical waveguide, which opening runs parallel to the optical axis of the optoelectronic device, i.e. the longitudinal axis of the receiving opening lies on the optical axis of the optoelectronic device. In this case, the optical axis of the optoelectronic device is determined by the optical axis of an optoelectronic transducer contained in the device. In this case, it is preferably provided that the receiving opening extends as far as the side of the optoelectronic component that is remote from the circuit board, so that a plugged-in optical waveguide bears directly against the corresponding side of the optoelectronic component. It may furthermore be provided that an optical waveguide to be coupled is fixed to the holding apparatus by means of a previously fitted sleeve. The sleeve is fixedly connected to the optical waveguide. A metal insert or a plastic sleeve is involved, by way of example.

In a preferred refinement, the surface-mounted optoelectronic component has a housing with passive adjustment structures which interact with corresponding passive adjustment structures of the holding apparatus.

In an advantageous refinement, the holding apparatus is fixedly connected to the circuit board, in particular is anchored in the circuit board or is adhesively bonded thereto or is injection-molded thereto. By way of example, the holding apparatus is anchored in the circuit board in an interlocking and/or force-fitting manner by means of spreading parts. A fixed connection of the holding apparatus to the circuit board has the advantage that forces that occur are dissipated to the circuit board and do not have to be absorbed by the optoelectronic component itself.

However, it likewise lies within the scope of the present invention for the holding apparatus to be fixed directly to the housing of the optoelectronic component, for example adhesively bonded thereto or injection-molded thereto. The connection may be releasable or non-releasable.

In a preferred refinement of the invention, it is provided that the optoelectronic component has latching structures, which enable a (releasable or non-releasable) latching of the holding apparatus to the optoelectronic component. Corresponding latching means are also provided on the holding apparatus. By way of example, component and holding apparatuses can be connected to one another by means of a clip connection. Latching structures may be formed for example as a groove or other structure in the plastic body or in the leadframe of the optoelectronic component.

An optical waveguide to be coupled is also preferably connected in latchable fashion to the holding apparatus. For this case, the holding apparatus has latching means, which enable a latching of an optical waveguide in the holding apparatus. Instead of or in supplementation of latching means, it may also be provided, by way of example, that the holding apparatus has an elastic wall, which holds, in a force-fitting manner, an optical waveguide to be coupled. In principle, the connection between optical waveguide and coupling apparatus may also be releasable or non-releasable.

In a preferred refinement, the holding apparatus has a receiving region for an optical waveguide, which runs at an angle with respect to the optical axis of the optoelectronic component, and also integrated deflection means, by which the light to be coupled in is deflected to the optical axis of the optoelectronic component. Particularly preferably, the receiving region runs parallel to the circuit board and the integrated deflection means deflect the light by 90°, so that light can be coupled in or out parallel to the printed circuit board.

In a preferred design of the invention, the connection of optoelectronic component and holding apparatus is premounted, the connection in turn representing an SMD component. This permits a cost-effective automated SMD mounting of the premounted unit of component and holding apparatus.

The electrical linking of the surface-mounted optoelectronic component to the circuit board is preferably effected in accordance with the SMD standard, so that it is once again possible to have recourse to existing standard technologies.

In an advantageous refinement, a light-varying element, in particular a lens or a filter glass, is integrated into the surface-mounted optoelectronic component and/or the holding apparatus. This enables light to be coupled in or out effectively.

The solution according to the invention is distinguished, in a second aspect of the invention, by an arrangement comprising a surface-mounted optoelectronic component and a circuit board provided with electrical lines, the optoelectronic component being surface-mounted on said circuit board. In this case, the optical axis of the optoelectronic component runs perpendicular to the plane of the circuit board and the circuit board has a cutout, light being coupled into or out of the optoelectronic component in the direction of the cutout of the circuit board.

This configuration enables a cost-effective and simple optical coupling of a surface-mounted optoelectronic component arranged with the active side downward on a circuit board.

In a preferred refinement of this variant of the invention, an optical waveguide into which light is coupled in or out is arranged in the cutout. The optical waveguide preferably bears directly against the side of the optoelectronic component that faces the circuit board, with the result that a direct coupling of light takes place. In this case, too, it is possible, if appropriate, additionally to provide light-shaping elements or filters.

For better and simpler fixing, a sleeve or other apparatus may be provided, in which the optical waveguide is arranged, the sleeve or apparatus being inserted into the cutout of the circuit board.

In a further refinement of the second variant of the invention, the circuit board contains at least one optical waveguide and means for deflecting the light by 90° are arranged in the cutout of the circuit board.

The deflection means are preferably formed by a plug-in part having an obliquely running area, which plug-in part is plugged into the cutout of the circuit board. As an alternative, the deflection means are formed at a region of the corresponding optical waveguide that projects into the cutout of the circuit board. In this case, the projecting region of the optical waveguide preferably has an obliquely running end area.

The arrangement of the optical waveguide at the circuit board may also be effected in diverse ways. In a first refinement, the optical waveguide is inserted into a groove, in particular V-groove, of the circuit board and adhesively bonded there. The groove is introduced into the circuit board by milling, for example. In a second refinement, the optical waveguide is pressed into the circuit board, preferably at a point in time at which a circuit board composed of plastic has not yet cured. In a third refinement, the optical waveguide is formed as a wave-guiding channel integrated into the circuit board.

The surface-mounted optoelectronic component is preferably a transmission apparatus, in particular a laser diode or a light-emitting diode, and/or a reception apparatus, in particular a photodiode, which are arranged in an SMD component. The surface-mounted optoelectronic component may additionally have electrical components such as a driver chip, a preamplifier and/or capacitors.

BRIEF DESCRIPTION OF THE DRAWINGS

The invention is explained in more detail below using a plurality of exemplary embodiments with reference to the figures of the drawing, in which:

FIG. 4A shows a plan view of a surface-mounted optoelectronic component in accordance with a fourth exemplary embodiment of a transmission and/or reception arrangement;

FIG. 4B shows a lateral sectional view of the component of FIG. 4A, the illustration additionally showing a holding apparatus with integrated deflection means that can be connected in latchable fashion to the component;

FIG. 5 shows an exemplary embodiment of an optoelectronic transmission and/or reception arrangement in which a surface-mounted optoelectronic component is arranged directly on a circuit board and light is coupled in and/or out through a cutout in the circuit board;

DESCRIPTION OF A PREFERRED EXEMPLARY EMBODIMENT

Figure 1:
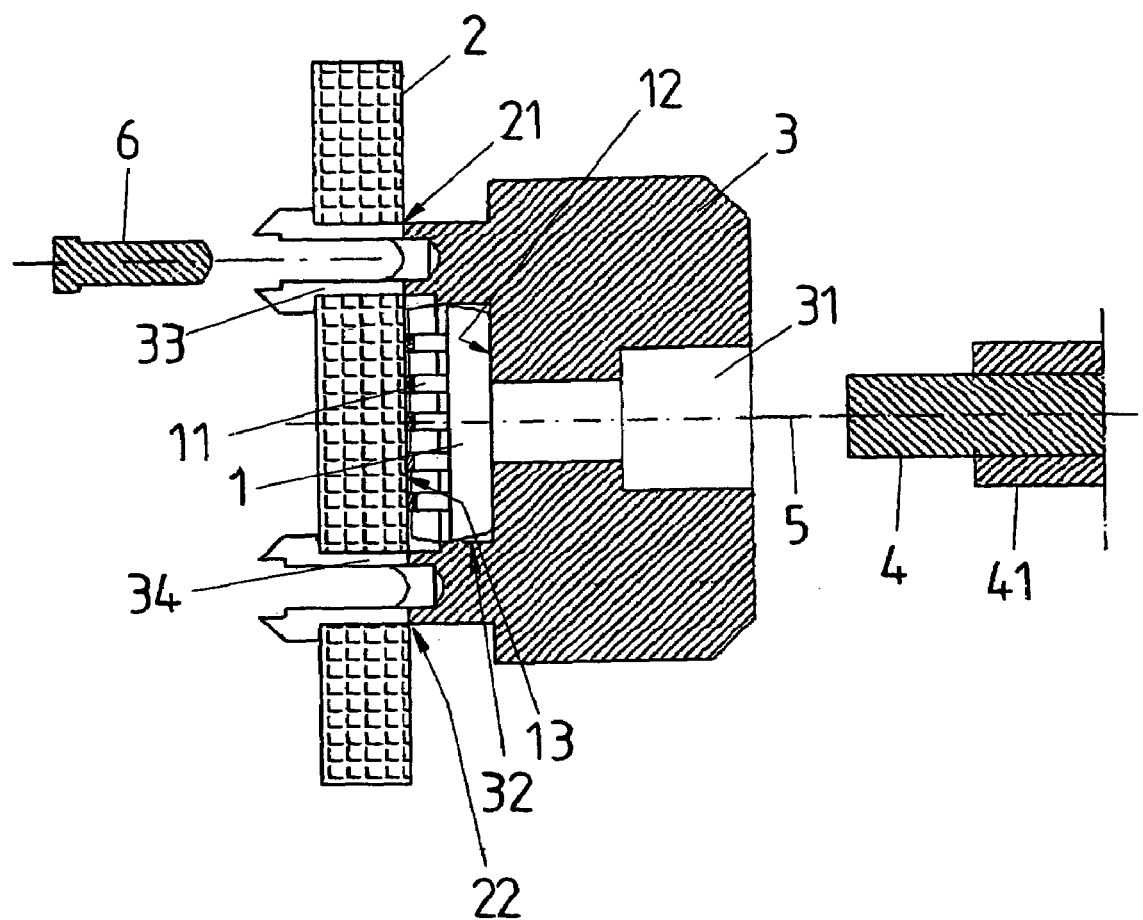
FIG. 1 shows a first exemplary embodiment of an optoelectronic transmission and/or reception arrangement having a surface-mounted optoelectronic component, a holding apparatus for receiving and orienting an optical waveguide and a circuit board, the holding apparatus being anchored in the circuit board.

The sectional illustration of FIG. 1 shows a first exemplary embodiment of an optoelectronic transmission and/or reception arrangement. The arrangement has a surface-mounted optoelectronic component 1, a circuit board 2 and a holding apparatus 3 for receiving and orienting an optical waveguide 4 to be coupled to the optoelectronic component 1.

The surface-mounted optoelectronic component 1 is formed by an injection-molded chip in which an optoelectronic transducer, for example an LED, a photodiode or a laser diode, if appropriate with associated electrical devices such as driver module or preamplifier module, is situated on a leadframe. The component 1 is embodied using SMD technology, i.e. is surface-mounted. For this purpose, it has lateral electrical small contact legs 11 of the leadframe. However, contact may also be made in a different way, for example via contact pads at the underside of the component 1.

A plastic encapsulation comprising a polymer composition, for example, forms a plastic body and a housing of the component 1. In this case, the plastic encapsulation may be transparent, light being coupled in or out through the transparent plastic. As an alternative, the encapsulation is non-transparent, in which case, however, an optical window for coupling light in/out is arranged above the actual optoelectronic transducer. Such a transparent window may be provided for example by a sapphire, a transparent polymer or glass. The housing of the component may, in principle, also be formed in a manner other than by a plastic encapsulation.

The component 1 has a side (upper surface) 12 remote from the circuit board 2 and a side (lower surface) 13 facing the circuit board 2. In the exemplary embodiment illustrated, light is coupled in and/or out through the side 12 remote from the circuit board 2.

The circuit-mountable component 1 is arranged and contact-connected like a customary electrical chip on the circuit board 2. In addition to an electrical contact-connection of the SMD component 1, the component is in this case soldered or adhesively bonded onto the circuit board 2 via a chip adhesive-bonding island. In this case the chip adhesive-bonding island is preferably situated adjacent to the internal leadframe of the SMD component 1, with the result that it is possible to effect a good heat dissipation of the heat produced in the SMD device into the circuit board 2.

The circuit board 2 is a printed circuit board (PCB) of arbitrary design or a so-called "motherboard". The circuit board 2 or printed circuit board comprises a base material made, in particular, of plastic or ceramic. It is provided with conductor tracks on one or two sides. The circuit board may also be formed as a multilevel printed circuit board. Furthermore, electrical components or components of integrated optics can be integrated into the circuit board through the use of thick-film technology, thin-film technology or hybrid technology. The illustration of FIG. 1 schematically represents arbitrary circuit boards.

The holding apparatus 3 has a receiving opening 31 with two regions of different diameters for receiving and orienting the optical waveguide 4, which is surrounded by a sleeve 41. The holding apparatus 3 represents a fiber adapter which fixes the optical fiber 4 to be coupled relative to the circuit-mountable device 1 and establishes it to the common optical axis 5.

In this case, the holding apparatus 3 has a cutout 32 on the side facing the printed circuit board 2, the component 1 being situated in said cutout. The holding apparatus 3 is to an extent placed over the component 1. The external dimensions of the component 1 and cutout 32 are coordinated with one another in an interlocking fashion in this case, i.e. passive adjustment structures are present which bring about an automatic orientation of component 1 and holding apparatus 3 along the optical axis 5.

The holding apparatus 3 is fixedly anchored in the circuit board 2, for which purpose the holding apparatus 3 forms latching elements 33, 34, which are inserted into cutouts 21, 22 of the circuit board 2 and secured there by means of a spreading wedge 6.

The anchoring of the holding apparatus 3 in the circuit board 2 has the advantage that forces that occur during insertion are absorbed by the stable printed circuit board 2.

The order of mounting of the arrangement illustrated in FIG. 1 may be realized in two variants. In the first variant, firstly the device 1 is soldered onto the circuit board 2. The holding apparatus 3 is subsequently emplaced. After the optical waveguide 4 has been plugged into the receptacle 31 of the holding apparatus 3, the arrangement is ready for operation.

In a second mounting variant, firstly the SMD component 1 is inserted into the holding apparatus 3, so that the component 1 and holding apparatus 3 represent a unit which can be supplied to a customer. In this case, the unit comprising the component 1 and holding apparatus 3 is in turn surface-mounted. The customer then places and anchors of the arrangement 1, 3 on the circuit board 2 and carries out the soldering operation.

The advantage of this mounting variant is that the SMD component 1, which is movable to a certain extent during the soldering process, is oriented on the circuit board 2, so that fewer forces are exerted on the component 1 by the holding apparatus 3 and forces that occur primarily act on the circuit board 2. However, this order of mounting is only possible if the holding apparatus 3 withstands the soldering temperatures.

The way in which the optical waveguide 4 is optically coupled to the holding apparatus 3 is illustrated only by way of example in FIG. 1. For example, it is likewise possible for a bare fiber end 4 to be plugged into the holding apparatus 3 and fixed (pigtail embodiment). Equally, it is possible, in principle, for the fiber end to terminate in a latchable optical plug, which is then plugged into a plug receptacle integrated in the holding apparatus 3.

Furthermore, it may be provided, independently of the type of plug connection, that a light-shaping element, for example a lens, is arranged between the end fiber of the optical fiber 4 to be coupled and the light exit window or optical window of the SMD component 1.

The optical waveguide 4 to be coupled may be a POF (plastic optical fiber) or a glass fiber (monomode or multimode).

Figure 2A:
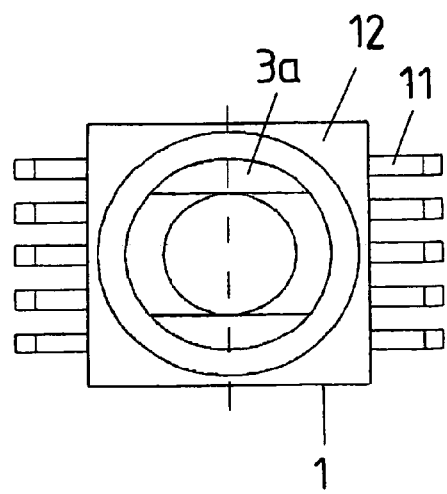
FIG. 2A shows a plan view of a surface-mounted optoelectronic component and an associated holding apparatus in accordance with a second exemplary embodiment of a transmission and/or reception arrangement.
Figure 2B:
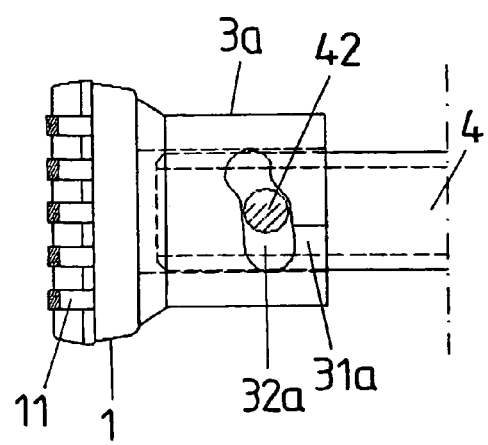
FIG. 2B shows a side view of the arrangement of FIG. 2A.

FIGS. 2A, 2B show an alternative configuration of an optoelectronic transmission and/or reception arrangement, in which, unlike in FIG. 1, the holding apparatus 3a is not anchored on the circuit board 2, but rather is fixed on the SMD component 1.

FIG. 2A reveals the SMD component 1 with the small contact legs 11 and the surface 12 remote from the circuit board 2. The holding apparatus 3a is permanently applied, e.g. adhesively bonded or injection-molded to the surface 12. In this case the holding apparatus 3a is oriented to a specific reference geometry, e.g. the edge of the SMD component 1.

The exemplary embodiment of FIGS. 2A, 2B provides for an optical fiber 4 that is to be coupled to be connected in latchable fashion to the holding apparatus 3a. For this purpose, the holding apparatus 3a has an elongate cutout 32a with mutually offset end regions into which a laterally protruding pin of the optical fiber 4 can be latched or unlatched by rotation. However, the bayonet catch illustrated in FIG. 2B is to be understood solely by way of example.

It may equally be provided that the fiber 4 is arranged in nonreleasable fashion in the holding apparatus 3a, for example by means of adhesive bonding or welding.

Figure 3A:
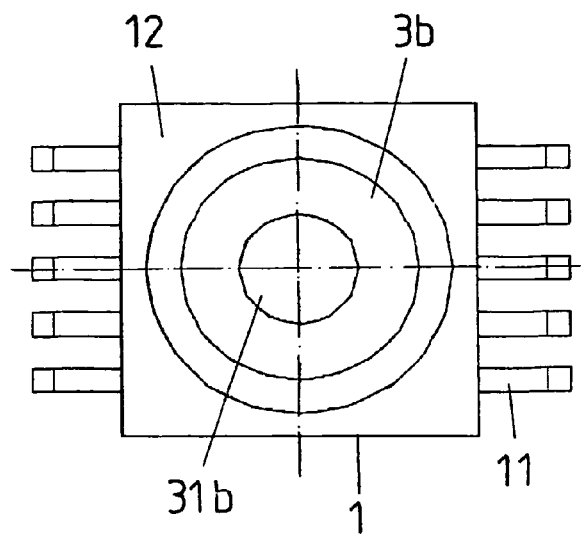
FIG. 3A shows a plan view of a surface-mounted optoelectronic component and an associated holding apparatus in accordance with a third exemplary embodiment of a transmission and/or reception arrangement.
Figure 3B:
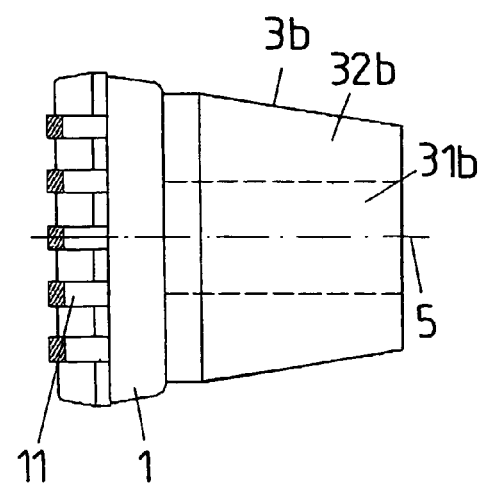
FIG. 3B shows a side view of the arrangement of FIG. 3A.

The exemplary embodiment of FIGS. 3A, 3B likewise shows an optoelectronic transmission and/or reception arrangement, in which the holding apparatus 3b is applied to the surface 12 of the SMD device 1 in nonreleasable fashion. The material of the wall 32b adjoining the central hole 31b of the holding apparatus 3b is preferably elastic in this exemplary embodiment. At the same time, the hole 31b has a slightly smaller diameter than an optical fiber to be introduced. When the optical fiber is introduced into the opening 31b, the elastic wall 32b is slightly deformed, so that the optical fiber is received in a force-fitting (pressfitting) manner. However, it may equally be provided that the fiber can readily be introduced into the receiving opening 31*b*, the fiber in this case preferably being adhesively bonded into the opening 31*b*.

In the case of the exemplary embodiments in FIGS. 2 and 3, all the forces that occur during plugging have to be dissipated via the body of the component 1. The forces are conducted to the circuit board 2 via the chip adhesive-bonding island and the small legs 11.

SMD component 1 and holding apparatus 3*a*, 3*b* represent a nonreleasably connected unit, which in turn form an SMD device. The premounted unit can be supplied to a customer, and the customer then performs emplacement onto the circuit board and the soldering operation.

FIGS. 4A, 4B show a further exemplary embodiment of an optoelectronic transmission and/or reception arrangement. What is special about this embodiment is that the SMD component and the holding apparatus can be connected to one another in latchable fashion. For this purpose, the housing of the SMD component 1*c* is formed in such a way that a projection 12*c* is formed on the underside. The holding apparatus 3*c* has lateral latchable arms 34*c*, 35*c* which form lugs 36*c*, 37*c* which bear for the purpose of latchable connection behind the latching projection 12*c* of the SMD component 1*c*.

In the case of the exemplary embodiment of FIG. 4B, it is additionally provided that, unlike in the previous exemplary embodiments, the receiving region 31*c* for the coupling of an optical waveguide does not run parallel to the optical axis of the component 1, but rather at any angle with respect thereto. In the exemplary embodiment of FIG. 4B, the receiving region 31*c* runs parallel to a circuit board onto which the SMD component 1*c* is soldered. In order to deflect the light coupled in along the axis 50 onto the axis 5 of the component 1, a deflection area 33*c* that runs obliquely is provided, which may additionally be mirror-coated. In order to improve the coupling of light, a light-shaping element in the form of a lens 40 is furthermore integrated into one surface of the SMD device 1*c*.

An elongate opening 32*c* in the wall of the holding apparatus 3*c* serves for latchable connection to an optical waveguide in accordance with the configuration of FIG. 2B. Of course, the configuration of FIG. 4B may also be embodied without such an opening 32*c*.

The external contours of SMD component 1*c* and latchable holding apparatus 3*c* are coordinated with one another, with the result that passive adjustment is effected during latching.

FIG. 5 shows a configuration of an optoelectronic transmission and/or reception arrangement, in which light is coupled into or out of the optoelectronic component 1 in the direction of a cutout 23 formed in the circuit board 2 below the component 1. In this case, the cutout is preferably circular or quadrangular and centered on the optical axis 5 of the component 1.

In order to realize a coupling-in or coupling-out of light at the underside 13 of the SMD component 1, an optical access in the plastic housing is formed in the chip adhesive-bonding island (not illustrated). Said optical access may be provided by a sapphire, a transparent polymer or glass in a similar manner to an optical access at the top side 12 of the component.

The light coupled in or out perpendicularly downward along the optical axis 5 is coupled into or out of an optical waveguide (not illustrated). For receiving such an optical waveguide, in the exemplary embodiment illustrated, a sleeve 9 is plugged into the cutout 23 of the circuit board, which serves as a fiber holding apparatus and centrically has a receiving opening for the coupling of an optical fiber. Light is coupled directly between the end area of the optical fiber and the optical window at the underside 13 of the SMD device 1.

Figure 6A:
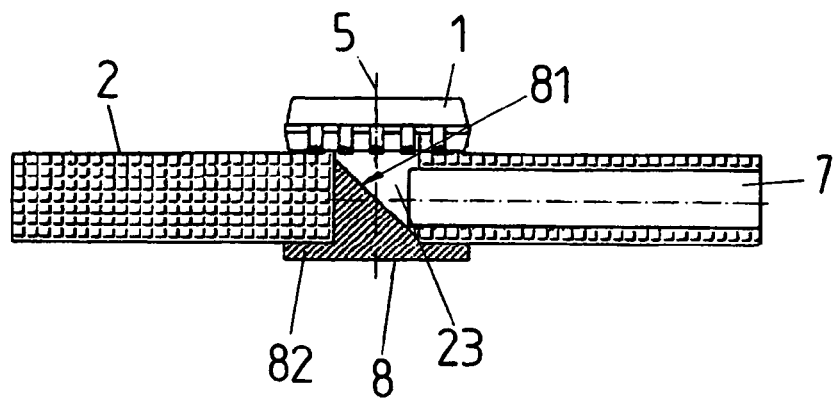
FIG. 6A shows a first exemplary embodiment of an optoelectronic transmission and/or reception arrangement in which a surface-mounted optoelectronic component is arranged on a circuit board and coupling of light to an optical waveguide integrated into the circuit board is effected.
Figure 6B:
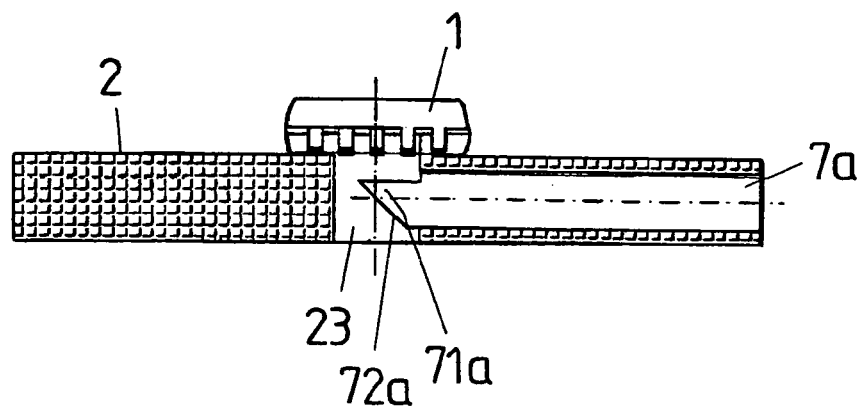
FIG. 6B shows a second exemplary embodiment of an optoelectronic transmission and/or reception arrangement in which a surface-mounted optoelectronic component is arranged on a circuit board and optically coupled to an optical waveguide integrated into the circuit board.
Figure 6C:
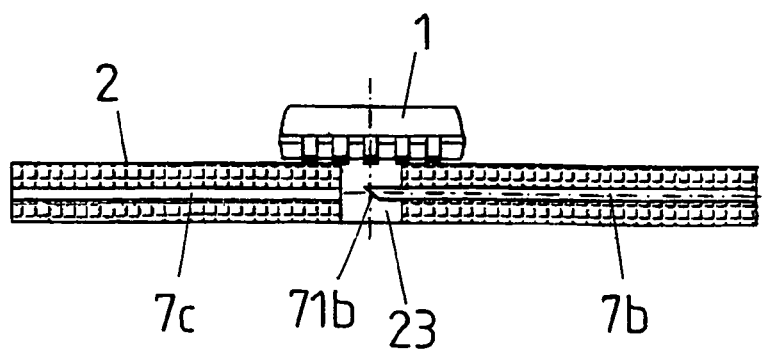
FIG. 6C shows a third exemplary embodiment of an optoelectronic transmission and/or reception arrangement in which a surface-mounted optoelectronic component is arranged on a circuit board and coupled to an optical waveguide integrated into the circuit board.

In the configurations of FIGS. 6A to 6C, an SMD component is arranged on the circuit board 2 with its optical window in the direction of the circuit board 2, in a similar manner to that in FIG. 5. A cutout is once again formed in the circuit board 2 below the SMD component 1 and in centric arrangement with respect to the optical axis 5 thereof. However, coupling-in and/or coupling-out of light is not effected perpendicularly to the plane of the circuit board 2. Rather, in these exemplary embodiments, an optical waveguide which is to be optically coupled to the component 1 is integrated into the circuit board 2 itself.

In the case of exemplary embodiment shown in FIG. 6A, a POF fiber 7 is integrated into the circuit board 2. The POF fiber 7 is inserted for example into a V-groove in the surface of the circuit board 2, which is provided for example by milling the circuit board. After the POF fiber has been inserted, the groove is covered with an encapsulation material. It is equally conceivable to press the POF fiber into the circuit board, in particular if the latter comprises a plastics material and the pressing-in is effected before the plastics material has completely cured.

In the same way, a glass fiber instead of the POF fiber 7 could be introduced into the circuit board 2.

For the coupling of light between the POF fiber 7 and SMD component 1, a deflection part 8 with an oblique area 81 running at any angle of 45° with respect to the optical axis 5 is introduced into the cutout 23 and fixed with flange regions 82 on the underside of the circuit board 2. The deflection part 8 enables direct coupling of light between the POF fiber 7 and the component 1. The oblique face 81 may additionally be mirror-coated.

FIG. 6B manages without a separate deflection part 8. Instead, a region 71*a* of the POF fiber 7*a* that projects into the cutout 23 is formed in wedge-shaped fashion in such a way that the light is coupled into the core of the POF fiber or in the direction of the SMD component 1 at an end area 72*a* running at an angle of 45°. A corresponding wedge 71*a* may already be provided during the production of the POF fiber 7*a*.

In the case of the exemplary embodiment of FIG. 6C, an optical waveguide 7*b* is introduced into the circuit board 2 in integrated-optical fashion. For this purpose, by way of example, channels are introduced into the material of the circuit board 2 and are partially filled with the core material of the optical waveguide, and the channels are subsequently filled again with the material of the circuit board, which forms the cladding of the optical waveguide. The cross section of the optical waveguide 7*b* is rectangular or square, for example. Light is coupled in or out once again via a wedge-shaped region 71*b* projecting into the cutout 23 in accordance with the arrangement of FIG. 6B.

In the circuit carrier 2, a further optical waveguide 7*c* may adjoin the cutout 23, in which case it may be provided that the light is coupled out from the optical waveguide 7*b* into the SMD component 1 only partially or only for a specific wavelength.

It should be pointed out that, in particular in the case of the exemplary embodiments of FIGS. 6A to 6C, the transducers arranged in the SMD components may be formed as an array of optoelectronic transducers which are each associated with a data channel. Accordingly, an optical waveguide 7, 7*a*, 7*b* is provided in the circuit board 2 for each data channel, the individual optical waveguides being arranged in parallel in the circuit board.

All the exemplary embodiments described permit cost-effective mechanical and optical coupling of an optical waveguide to a standard SMD component containing at least one optoelectronic transducer. If an optical waveguide to be coupled can be connected to the SMD component by means of a holding apparatus, the unit comprising the SMD component and holding apparatus preferably in turn forms an SMD component. The combination of an SMD component and holding apparatus can thereby be highly automated and readily applied to existing SMD placement production lines.

We claim:

1. An optoelectronic transmission and/or reception arrangement comprising:
   a surface-mounted optoelectronic component defining an optical axis,
   a holding apparatus having a receiving opening for receiving and orienting an optical waveguide such that the optical waveguide is coupled to the optoelectronic component,
   wherein the holding apparatus is solely fixed to the housing of the optoelectronic component;
   a circuit board provided with electrical lines and defining a plane,
   wherein the optoelectronic component is surface-mounted on said circuit board such that
   the optical axis of the optoelectronic component is perpendicular to the plane of the circuit board, and
   wherein the holding apparatus is mounted over the optoelectronic component such that the optoelectronic component is positioned between the holding apparatus and the circuit board.

2. The arrangement according to claim 1, wherein the optoelectronic component has latching structures for latching the holding apparatus to the optoelectronic component.

3. The arrangement according to claim 1, wherein the holding apparatus is adhesively bonded or injection-molded onto the housing of the optoelectronic component.

4. An optoelectronic transmission and/or reception arrangement comprising:
   a surface-mounted optoelectronic component defining an optical axis;
   a holding apparatus for receiving and orienting an optical waveguide such that the optical waveguide is coupled to the optoelectronic component, wherein the holding apparatus is mounted over the optoelectronic component such that the optoelectronic component is positioned between the holding apparatus and the circuit board,
   a circuit board provided with electrical lines and defining a plane;
   wherein the optoelectronic component is surface-mounted on said circuit board such that, the optical axis of the optoelectronic component is perpendicular to the plane of the circuit board, and
   wherein the holding apparatus further comprises at least one of the following:
      means for latching an optical waveguide inserted into the holding apparatus;
      an elastic wall for receiving, in a force-fitting manner, the optical waveguide;
      a receiving opening configured to receive the optical waveguide at an angle with respect to the optical axis of the optoelectronic component, and the holding apparatus further comprising an integrated deflection means for deflecting light passing on the optical axis between the optoelectronic component and the optical waveguide; or
   wherein the holding apparatus is at least one of anchored in the circuit board, adhesively bonded to the circuit board, and injection-molded to the circuit board, and wherein the holding apparatus anchored in the circuit board is at least one of an interlocking and force-fitting manner by spreading parts.

5. The arrangement according to claim 4, wherein the holding apparatus has a receiving opening for an optical waveguide, wherein at least a portion of the receiving opening extends parallel to the optical axis of the optoelectronic component.

6. The arrangement according to claim 4, wherein the receiving opening extends to an upper surface of the optoelectronic component, so that a plugged-in optical waveguide bears directly against the upper surface of the optoelectronic component.

7. The arrangement according to claim 4, wherein the holding apparatus further comprises a previously fitted sleeve for coupling an optical waveguide.

8. The arrangement according to claim 4, wherein the surface-mounted optoelectronic component has a housing with passive adjustment structures which interact with corresponding passive adjustment structures of the holding apparatus.

9. The arrangement according to claim 4, wherein the receiving opening extends parallel to the plane of the circuit board, and wherein the integrated deflection means deflects the light by 90°.

10. The arrangement according to claim 4, wherein the connection of optoelectronic component and holding apparatus is premountable and in turn represents a surface-mounted component.

11. The arrangement according to claim 4, wherein the electrical linking of the surface-mounted optoelectronic component of the circuit board is effected in accordance with the SMD standard.

12. An optoelectronic transmission and/or reception arrangement comprising:
   a surface-mounted optoelectronic component defining an optical axis.
   a holding apparatus having a receiving opening for receiving and orienting an optical waveguide such that the optical waveguide is coupled to the optoelectronic component,
   a circuit board provided with electrical lines and defining a plane,
      wherein the optoelectronic component is surface-mounted on said circuit board such that the optical axis of the optoelectronic component is perpendicular to the plane of the circuit board, and
   wherein the holding apparatus is mounted over the surface-mounted optoelectronic component such that the optoelectronic component is positioned between the holding apparatus and the circuit board; and
   wherein a light-varying element, including at least one of a lens or a filter glass, is integrated into at least one of the surface-mounted optoelectronic component and the holding apparatus.

13. An optoelectronic transmission and/or reception arrangement comprising:
   a circuit board provided with electrical lines and defining a plane, and an optoelectronic component surface-mounted on said circuit board such that an optical axis defined by the optoelectronic component is perpendicular to the plane of the circuit board, wherein the circuit board defines a cutout positioned such that light is coupled into or out of the optoelectronic component passes through the cutout, and wherein the circuit board includes a means for deflecting the light by 90° that are arranged in the cutout of the circuit board.

14. The arrangement according to claim 13, wherein the circuit board includes at least one optical waveguide.

15. The arrangement according to claim 14, wherein the at least one optical waveguide is introduced into a groove of the circuit board.

16. The arrangement according to claim 14, wherein the at least one optical waveguide is pressed into the circuit board.

17. The arrangement according to claim 14, wherein the at least one optical waveguide comprises a wave-guiding channel integrated into the circuit board.

18. The arrangement according to claim 13, wherein the deflection means comprise a plug-in part having an obliquely running area, said plug-in part being plugged into the cutout of the circuit board.

19. The arrangement according to claim 13, wherein the deflection means are positioned at a region of the corresponding optical waveguide that projects into the cutout of the circuit board.

20. The arrangement according to claim 13, wherein the deflection means comprise an obliquely running end area of the optical waveguide.

21. The arrangement according to claim 13, wherein the surface-mounted optoelectronic component comprises one of a laser diode, a light-emitting diode, and a photodiode, which are arranged in an SMD chip.

22. The arrangement according to claim 13, wherein the surface-mounted optoelectronic component further comprises at least one of a driver chip, a preamplifier and one or more capacitors.

23. An optoelectronic transmission and/or reception arrangement comprising:

a circuit board provided with electrical lines and defining a plane, and an optoelectronic component surface-mounted on said circuit board such that an optical axis defined by the optoelectronic component is perpendicular to the plane of the circuit board, wherein the circuit board defines a cutout positioned such that light is coupled into or out of the optoelectronic component passes through the cutout, wherein the circuit board includes a means for deflecting the light by 90° that are arranged in the cutout of the circuit board, wherein the surface-mounted optoelectronic component further comprises at least one of a driver apparatus, a preamplifier and one or more capacitors.

* * * * *